United States Patent [19]

Matsushima et al.

[11] 4,146,099

[45] Mar. 27, 1979

[54] SIGNAL RECORDING METHOD AND APPARATUS

[75] Inventors: Hiroshi Matsushima, Neyagawa; Yasuharu Shimeki, Suita; Nobuyoshi Kihara, Amagasaki, all of Japan

[73] Assignee: Matsushita Electric Industrial Co., Ltd., Osaka, Japan

[21] Appl. No.: 823,705

[22] Filed: Aug. 11, 1977

[30] Foreign Application Priority Data

Aug. 17, 1976 [JP] Japan .................................. 51-98458
Dec. 27, 1976 [JP] Japan .................................. 51-160578
Dec. 27, 1976 [JP] Japan .................................. 51-160585

[51] Int. Cl.² ............................................. G06F 11/10
[52] U.S. Cl. .................... 340/146.1 F; 340/146.1 AG; 360/32
[58] Field of Search ............... 340/146.1 AG, 146.1 F; 235/306; 360/22, 30, 32, 38

[56] References Cited

U.S. PATENT DOCUMENTS 3,921,132  11/1975  Baldwin ..................... 340/146.1 AG
3,979,721   9/1976  Umemoto et al. ............ 340/146.1 F

OTHER PUBLICATIONS

A. H. Jones et al., "Digital Stereo Sound Recorder", *Wireless World*, Sep. 1972, pp. 432-435.
N. Sato, "PCM Recorder-A New Type of Audio Magnetic Tape Recorder", *Journal of the Audio Engineering Society*, vol. 21, No. 7, pp. 542-548.

*Primary Examiner*—Jerry Smith
*Attorney, Agent, or Firm*—Stevens, Davis, Miller & Mosher

[57] ABSTRACT

Signal recording method and apparatus for efficiently correcting a bit error due to dropout occurred in recording an analog data into a digital data and reproducing the digital data is disclosed. The digital signal converted from the analog signal is divided into a plurality of groups to each of which a parity check bit is added. Record pattern is recorded on a record medium by a recording apparatus in accordance with a regular coding such as FM (frequency modulation) or MFM (modified frequency modulation) coding such that more than one bits in a group are not simultaneously influenced by the dropout, e.g. individual bits in a group are spaced from each other by several tracks. On reproducing, the coded digital signal is decoded into the original digital signal and the dropout is detected utilizing the nature of the regularity of the coding. The parity is checked for each of the groups. In this a single error in the group can be corrected and a double error is supplemented by holding a previous value, whereby the error due to the dropout is reduced.

13 Claims, 12 Drawing Figures

SIGNAL RECORDING METHOD AND APPARATUS

Generally, in recording and reproducing a digital signal converted from a analog signal, a bit error will occur when a dropout exists during recording or reproducing and if the digital signal including the bit error is converted to analog signal without correction, an analog signal which includes pulsive noises which is materially different from the original signal will be reproduced. Various detection/correction systems for such bit error have been proposed. The detection systems include a system wherein a dropout is determined when an envelope of a reproduced signal falls below a predetermined threshold, a system wherein a parity bit is added to carry out parity check and a cyclic code system, all of which have disadvantages of low detection rate or the requirement of redundancy bits. The correction systems include a previous value holding system in which a value prior to the occurrence of the bit error is held and an interpolation system in which a mean value of a previous value and a post-value is adopted. When the number of samples for the signal is small, however, the latter system is not effective because there exists a considerable difference between the previous value and the post-value. Although an error correction system using the parity bits has been proposed, it is not practical because a number of redundancy bits are required to correct even a single bit in a group.

It is, therefore, a primary object of the present invention to provide signal recording and reproducing method and apparatus which suppress a noise due to the dropout and reproduce a high fidelity analog signal.

It is a second object of the present invention to provide digital signal recording and reproducing method and apparatus which can correct a signal error such as dropout without adding redundancy bits.

According to the present invention, an analog signal is converted into an M-bit digital signal, to which i ($1 \leq i < M$) parity bits are added, and the signal is then recorded parallelly on a record medium. On reproducing, the number of dropout bits in the reproduced signal is detected, and if the number of dropout bits is not more than i, the reproduced signal is corrected and if the number of dropout bits is more than i, a supplement signal is issued to produce a signal which is supplemented for the dropout.

For example, according to the present invention, the digital signal derived by analog-to-digital conversion is divided into a plurality of groups, to each of which at least one parity bit is added, and the groups are recorded. On reproducing, the detection of the dropout of the reproduced digital signal and the parity check are performed parallelly for each of the digital signal groups, and a single error in a group is corrected while a multiple error in the group is corrected by generating a correction signal by holding the signal prior to the occurrence of the error, to prevent a pulsive noise from being included in the reproduced analog signal.

According to the present method, the bit error due to the dropout is limited to one bit at most in one group, since such a bit error is correctable, the reproduced analog signal is not influenced by the bit error. Since the parity bits are the only redundancy bits, the number of the redundancy bits added is equal to the number of groups at most. By selecting an appropriate recording system the number of redundancy bits can be minimized. Since the number of bits recorded is equal to the number of bits required to reproduce the analog signal plus two or three additional bits at most, a higher efficiency recording than in other error correction systems is attained. In the worst case, if a plurality of bit errors occur in one group, they are supplemented by holding the previous value so that the pulsive noise is prevented from being included in the reproduced analog signal.

Figure 1:
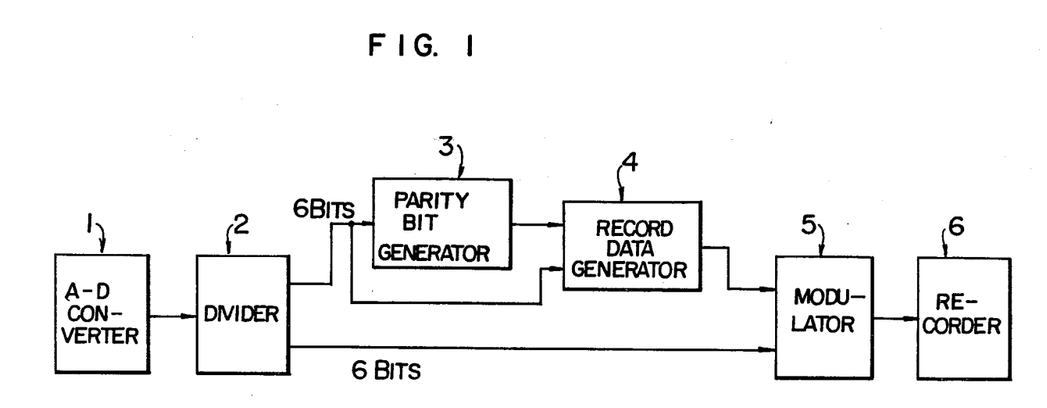
FIGS. 1 and 3 show block diagrams of recording sections in accordance with preferred embodiments of the present invention.

FIG. 1 shows an exemplary configuration of a recording section used in the present invention. An analog signal is converted into a 12-bit digital signal, for example, in an analog-to-digital converter (A - D converter 1). The 12-bit data is divided, for example, into higher order six bits and lower order six bits by a divider circuit 2. The higher order six-bit data is sent to a parity bit generation circuit 3 where a parity bit is generated. The parity bit and the higher order six bits constitute a record data which is necessary to carry out error correction and supplement on reproduction. This is performed by a record data generation circuit 4. No processing is carried out on the lower order six bits. The seven-bit data from the record data generating circuit 4 and the lower order six bits are applied to a modulation circuit 5 where each of the bits are frequency modulated with double frequency for parallel recording in a recording apparatus 6. The modulation system need not be limited to the frequency modulation (FM) system but other systems such as modified frequency modulation (MFM) system, phase encoding (PE) system and NRZI system may be used. On recording, it is essential that the individual bits in each group are recorded in parallel but it is not necessary that the groups are recorded in parallel.

Figure 2:
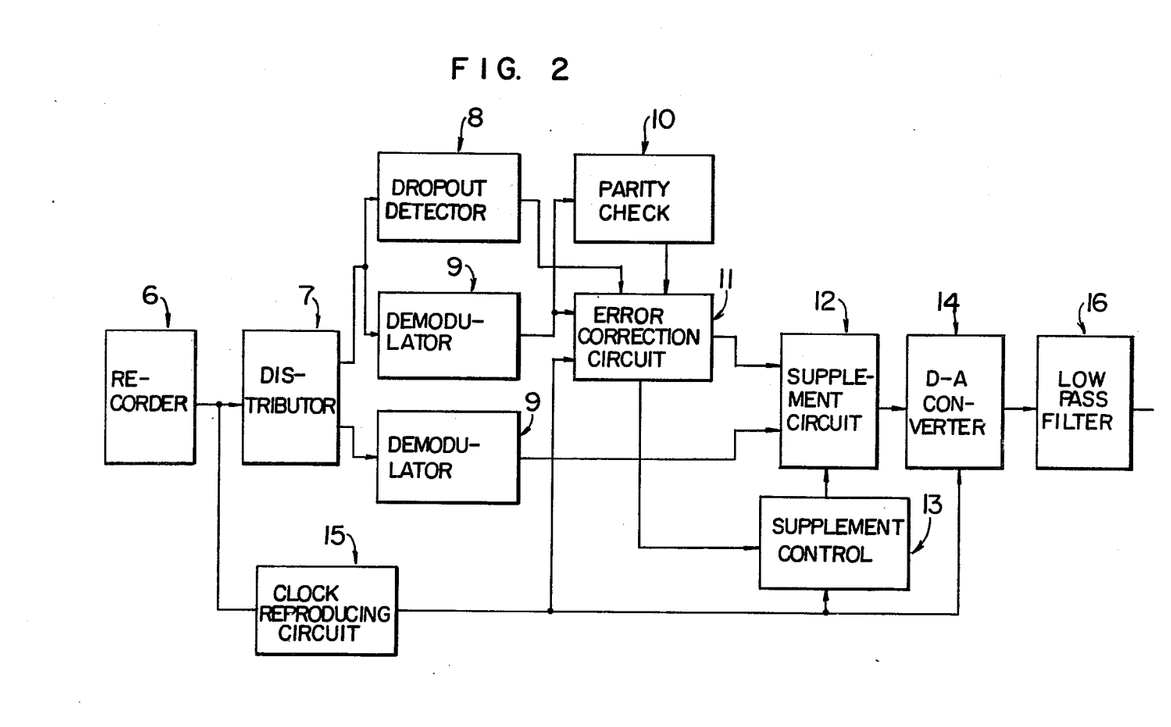
FIGS. 2 and 4 show block diagrams of reproducing sections in accordance with preferred embodiments of the present invention.

One exemplary configuration of a reproducing section used with the recording section shown in FIG. 1 is now explained with reference to FIG. 2. A reproduced signal from the recorder 6 fed parallel by bit is distributed by a distribution circuit 7 to a dropout detection circuit 8 and a demodulation circuit 9, group by group. The demodulated seven-bit data including the parity bit is applied to a parity check circuit 10 where parity is checked. If an error is detected by the parity check for the seven-bit data, the error information is sent to an error correction circuit 11. On the other hand, the dropout detection circuit 8 detects the dropout of the bits in the data based on the reproduced modulated signal. The detail of the dropout detection circuit 8 will be described later in conjunction with FIGS. 9 and 10. When the number of the dropout bits in the data is equal to one, an output of the parity check circuit indicates the detection of error, and the location of the error bit is decoded based on the signal from the dropout detection circuit 8 and the information of the located bit is inverted to correct the error. This error correction is performed by the error correction circuit 11. When the number of the dropout bits is more than one, the output of the parity check circuit 10 may or may not indicate the detection of the error. In this case, the error correction cannot be performed, and the error correction circuit 11 sends to a supplement control circuit 13 an error detection signal indicating that a plurality of errors exist in the seven bits including the parity bit. When the dropout detection circuit 8 indicates that a single dropout bit exists in a block but the parity check circuit 10 does not indicate the detection of the error, the dropout detection circuit 8 may be malfunctioning and the error correction circuit 11 does not send the error correction/detection signal but supplies the data as it is. The supplement control circuit 12, when it receives the data from the error correction circuit 11, combines the six-bit data excluding the parity bit with the lower order six-bit data decoded by the decoder circuit 9 to assemble a 12-bit data, which is then applied to a digital-to-analog converter (D/A converter) circuit 14.

A supplement circuit 12 is comprised of a register circuit and it sends the data from the error correction circuit 11 and the lower order six-bit data from the demodulator circuit 9 to the D-A converter circuit 14 in synchronism with clock signals reproduced by a clock reproducing circuit 15. When the error correction circuit 11 produces the signal indicating that a plurality of errors exist, the 12-bit data must be supplemented. The supplement may be carried out by a previous value holding system in which a content prior to the occurrence of the error is adapted, a primary interpolation system in which the signal in the error section is interpolated by the contents prior to and after the occurrence of the error, or an interpolation system in which the interpolation is carried out by a value predicted by a statistical nature of the analog signal, whereby the inclusion of the pulsive noise in the reproduced analog signal is prevented. In the present embodiment, the previous value holding system is explained. The supplement control circuit 13 is provided in order to achieve the previous value holding. The supplement control circuit 13 is comprised of a gate circuit which gates the clock signals from the clock reproducing circuit 15 to the supplement circuit 12 in response to the output from the error correction circuit 11. When the signal from the error correction circuit 11 is not present, the clock signal is gated to the supplement circuit 12, and when the signal from the error correction circuit 11 is present the clock signal is not gated to the supplement circuit 12 by the gate circuit so that the previous value holding operation is accomplished. Since the clock signal is supplied to the D - A converter circuit 14 without gating, the reproduced analog signal holds the waveform of the previous content when the clock signal is degated by the supplement control circuit 13. When no error exists or the error correction has been made, a correct reproduced analog signal is produced. Since the output of the D - A converter circuit 14 is a step wave, it is passed through a low pass filter circuit 16 to reproduce the original analog signal.

The multiple error condition will not continue over an extended period. When a recording system which causes a few multiple errors in the data group is used the supplement circuit operates a very few times, and hence high fidelity reproduction is attained. The recording system will be described hereinbelow. When a single bit error exists within N bits (N being equal to six in the illustrated embodiment) counted from the most significant bit, the error is corrected, but when the single bit error exists in the lower order (M - N) bits (M - N being equal to six in the illustrated embodiment) the pulsive noise is included in the reproduced analog waveform although such a pulsive noise is not detectable in an audio signal if N is equal to 8 with M being equal to 8. For higher fidelity, M is equal to N. In the latter case, although there exists an increased possibility that multiple errors in the M bits when the number M is large, this may be avoided by the recording system to be described later. Alternatively, it may be resolved in the following way.

After the analog signal has been converted into the M-bit digital signal, the M-bit digital signal is divided into i blocks, to each of which one parity bit is added to produce (M + i)-bit digital signal, and each block is recorded on the record medium parallel by bit. On reproduction, the error correction is performed for each of the blocks using the dropout detection and parity check described above. If any of the blocks is detected to include a plurality of dropout bits, it is determined that uncorrectable error is included in the (M + i)-bit digital signal and it is replaced by a supplement signal formed by the reproduced signal which has been reproduced prior to the occurrence of the error.

Figure 3:
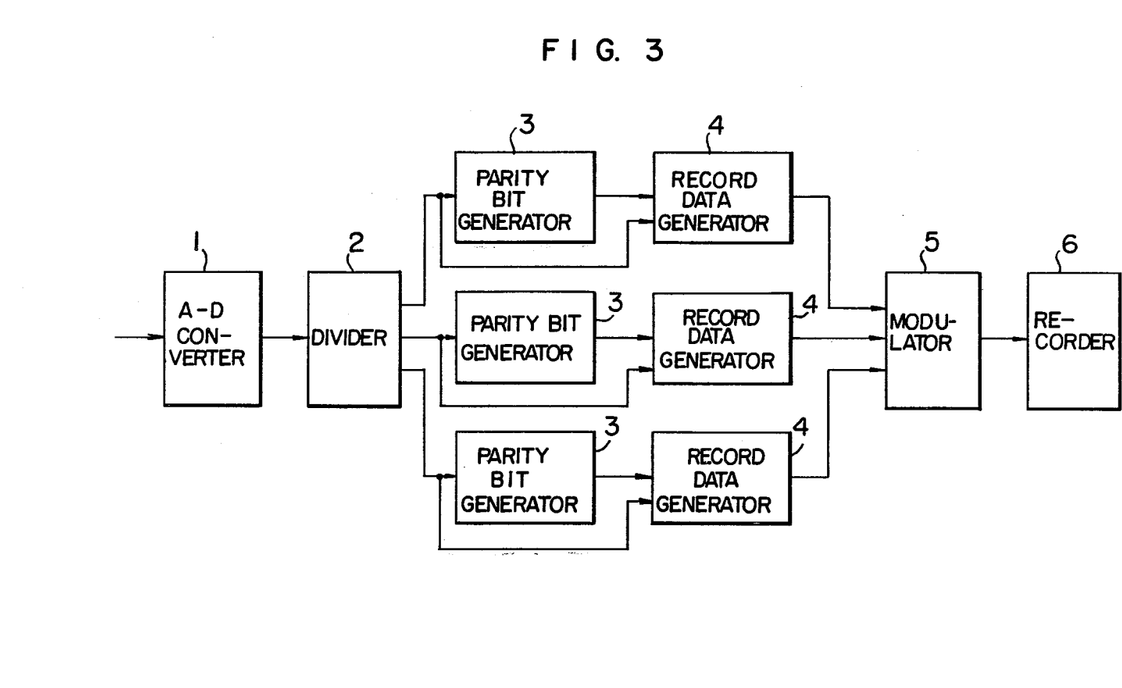

Another embodiment of the recording section used in the present invention is shown in FIG. 3. Those blocks having the same reference numerals as those shown in FIG. 1 are identical to the corresponding blocks. An analog signal is analog-to-digital converted into a 12-bit digital signal, which is then divided by the divider circuit 2 into three 4-bit data blocks. Many ways of dividing may be used. For example, 4-bit blocks may be taken sequentially starting from the most significant bit. After the data has been divided, a parity bit is generated for each block and a 5-bit record data is assembled, which is then applied to the modulation circuit 5 where it is recorded parallel by bit in the recording apparatus 6. On recording, it is essential that the individual bits in the block are recorded in parallel but it is not necessary that the blocks are recorded in parallel.

Figure 4:
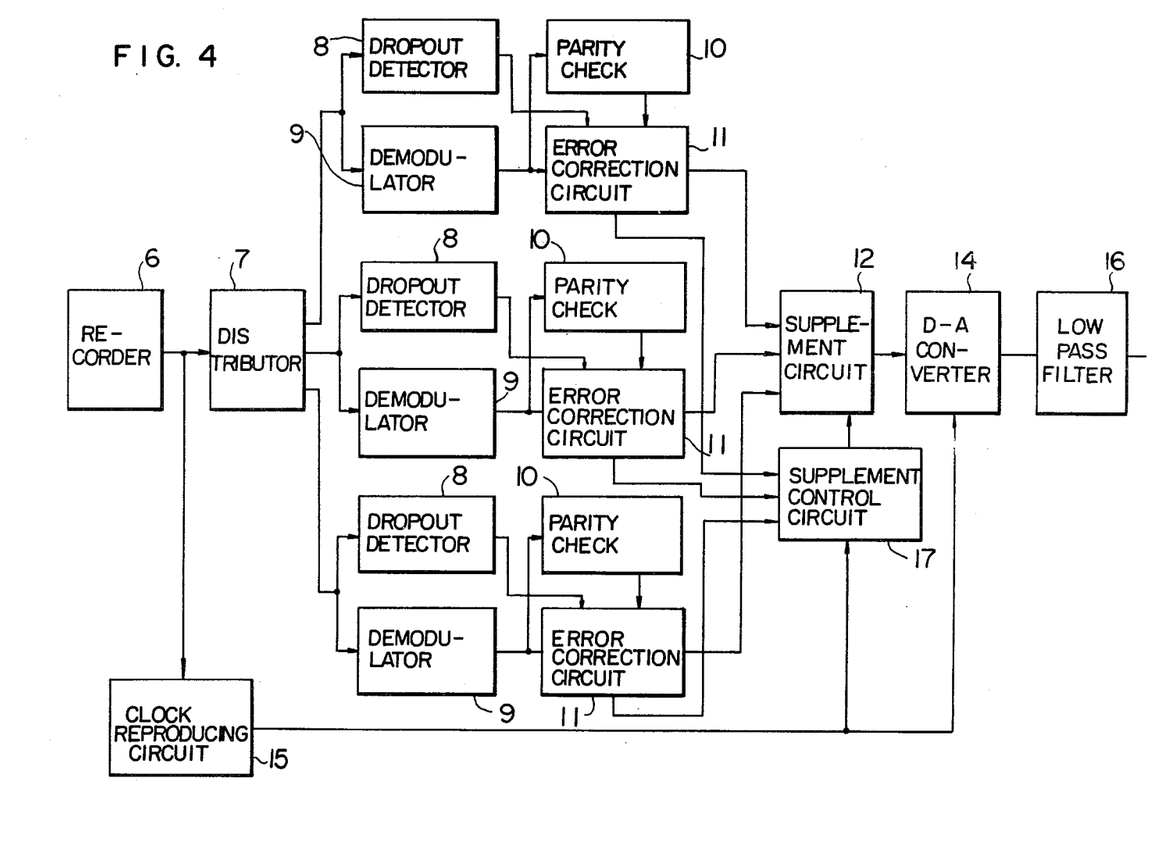

Another embodiment of the reproducing section used with the recording section of FIG. 3 is explained with reference to FIG. 4. The reproduced parallel-by-bit signal from the recording apparatus 6 is assembled for each of the blocks by the distribution circuit 7 and applied to the dropout detection circuit 8 and the demodulation circuit 9. The demodulated 5-bit data including the parity bit is applied to the parity check circuit 10 where parity is checked. When an error is detected by the parity check, the error information is sent to the error correction circuit 11. On the other hand, the dropout detection circuit 8 detects the dropout of the bits in the data based on the reproduced modulated signal. If the number of dropout bits in the data is equal to one, the error correction circuit 11 corrects the error in a manner described above. If the number of dropout bits is more than one, the error correction cannot be performed and the error correction circuit 11 sends to the supplement control circuit 12 an error detection signal indicating that a plurality of errors exist in the block. If the dropout detection circuit 8 indicates that a single dropout error exists in the block but the parity check circuit 10 does not detect the error, it is determined that the dropout detection circuit 8 malfunctioned, and the error correction circuit 11 does not send the error correction/detection signal and the data is sent out as it is. The supplement circuit 12, when it receives the data from the error correction circuit 11, combines three 4-bit data excluding the parity bit from each of the block data to assemble them into a 12-bit data, which is then applied to the digital-to-analog (D - A) conversion circuit 14.

The supplement circuit 12 is comprised of a register circuit, and it sends the data from three error correction circuits 11 to the D - A conversion circuit 14 in synchronism with clock signals reproduced by the clock reproducing circuit 15. If there exists a signal indicative of multiple errors in any of the three error correction circuits 11, the 12-bit data should be held in the bit state prior to the occurrence of the error. The supplement control circuit 17 comprises an OR circuit which responds to one or more of the signals from the error correction circuits 11 which are provided one for each block, and a gate circuit responsive to the output of the OR circuit to gate clock signals from the clock reproducing circuit 15 to the supplement circuit 12. When none of the error correction circuits 11 produces the signal, the clock signal is gated to the supplement circuit 12, and when any one of the error correction circuit 11 produces the signal, the clock signal is not gated to the supplement circuit 12 by the gate circuit, whereby previous value holding is attained. The output of the supplement circuit 12 is then applied to the D - A converter circuit 14, thence to the low pass filter 16 to reproduce the analog signal.

In the above embodiment, since the error is correctable when a single error exists in a data block, i scattered errors of i blocks can be corrected. This means that an error correction power is enhanced in comparison with a system in which the data consists of one block to which a parity bit is added, because the latter system can correct only one error while the present system in which the data is divided into i blocks and the bits in the blocks are scattered can correct i errors since there is little possibility that a plurality of errors are included in one block.

In order to minimize the occurrence of the condition where the error is uncorrectable and the previous value should be held in the embodiments described above, the individual bits in the group or block should be scattered on recording. The reason therefor will be explained below in conjunction with embodiment of scattered bits. A principal cause of the dropout is dust. Considering the size of dust, the probability of the occurrence of the dust in a pluarlity of tracks decreases as the number of tracks increases.

Figure 5:
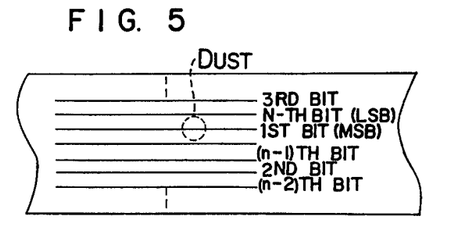
FIGS. 5 and 6 show signal patterns recorded on a tape in other embodiment of the present invention.
Figure 6:
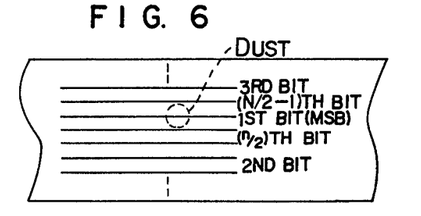

FIG. 5 shows an example in which one channel of an analogue signal is converted by analogue-to-digital conversion to produce a digital signal of n bits. These bits are sequentially grouped into several bit groups (each comprised of a certain number of bits), from the upper or more significant bits, to be recorded on a magnetic tape. Assuming now that n number of bits are divided into two groups comprising the upper side bit group and lower side bit group, these groups of bits are recorded on the magnetic tape by recording the nth and (n-1)th bits (taken out of the lower side group being least significant in representing the amplitude level of the analog signal) adjacent to the first bit (taken out of the upper side group being most significant in representing the amplitude level of the analog signal); that is, by recording alternatively a more significant bit of the upper side group and a less significant bit of the lower side group a reduction is caused in the probability that more than one bit of the upper side group is simultaneously affected by dropout. Thus, the occurrence of a plural of errors in the upper side bit group is avoided. An example as shown in FIG. 6 may also be employed. In the illustrated example, the number n of the bits is an even number, and n/2-th or (n/2-1) bit is arranged adjacent to the MSB.

Figure 7:
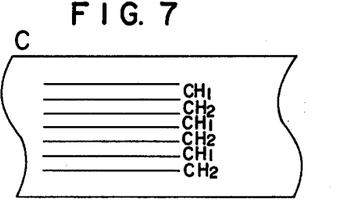
FIGS. 7 and 8 show record formats on the tape.
Figure 8:
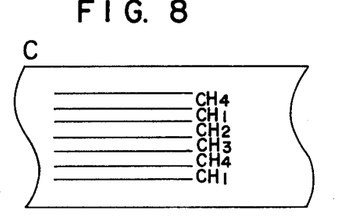

FIG. 7 shows an example which includes two channels. Channels $CH_1$ and $CH_2$ are alternately arranged over a plurality of record tracks. The assignment of the individual tracks within the channel follows the rule shown in FIGS. 5 and 6. FIG. 8 shows an example of multi-channel, i.e. four channels in the illustrated example. The assignment of the individual tracks within the channel is similar to those shown in FIGS. 5 and 6. In all of the examples shown above, the digital signals for one sampled value align in the direction of width of the tape. In the examples shown in FIGS. 5 and 6, when a dropout error occurs, within one track, any group or one block does not include more than one bit errors and hence the error correction is carried out to reproduce high fidelity signal. When the dropout over two tracks occurs (as shown by broken lines in FIGS. 5 and 6), no multiple errors within one group or one block occur and hence the error correction can be carried out. The dropout over more than two tracks can be neglected because the probability thereof is extremely low. Accordingly, the probability of non-correctable error is also extremely low.

In the example shown in FIG. 7, if the number of bits per channel is constant, the track width must be reduced for a given width of the record tape because the number of tracks is doubled. Accordingly, the probability of the dropout per track is higher than that in the examples shown in FIGS. 5 and 6. When the dropout occurs over only one track, the dropout exists in only one channel. Since it is one bit within one sample, the reproduced signal is not influenced. When the dropout occurs over two tracks, the dropout per channel is only one bit, or it is one bit within one sample. Accordingly, the error is correctable and the reproduced signal is not influenced. The dropout over more than two channels can be neglected because the probability thereof is extremely low. Like in the example shown in FIG. 5, when the number of the dropout bits for one sample is one, the error can be corrected, and the influence to the reproduced signal by the occurrence of the two or more dropout bits in one sample can be minimized by the bit distribution of each channels as shown in the examples of FIGS. 5 and 6. The more than two dropout bits within one sample can be neglected because the probability thereof is extremely low.

Figure 9:
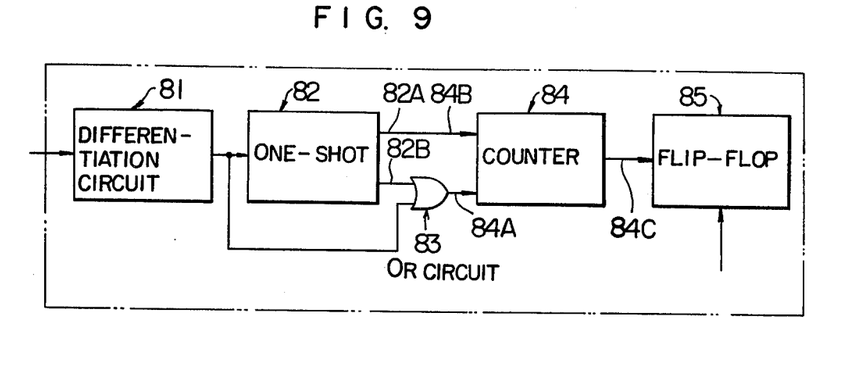
FIG. 9 shows a detailed configuration of a dropout detection circuit.

The dropout detection circuit is now explained in detail. FIG. 9 shows a configuration thereof and FIG. 10 shows waveforms thereof.

Figure 10:
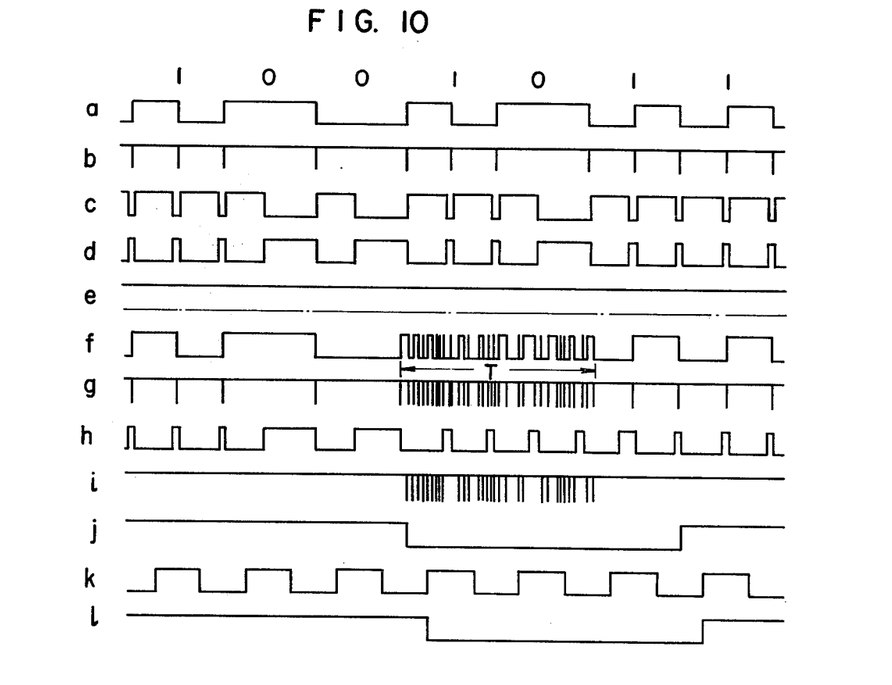
FIG. 10 shows waveforms for explaining the operation of the circuit of FIG. 9.

The signal reproduced from the record medium and distributed by the distribution circuit 7 is passed through a reproducing amplifier circuit and reshaped into a waveform shown in FIG. 10a, where the digital data train comprises 1 0 0 1 0 1 1 bits. The FM signal always includes polarity changes at the boundaries of the bit cells. The polarity change occurs at the center of bit cell for "1" data bit while no polarity change occurs at the center of the bit cell for "0" data bit. This signal waveform is applied to a differentiation circuit 81 to produce a waveform shown in FIG. 10b in which pulses exist only at the rise and fall of the signal. The output waveform of the differentiation circuit 81 is supplied to a monostable multivibrator (one-shot) 82 and an OR circuit 83. The one-shot 82 is of non-triggerable type in which when it is being triggered to produce a pulse, the one-shot 82 is not triggered by whatever pulse which arrives at the input thereof and always produce a pulse of a fixed duration. The duration of the pulse is set to be less than one half of the repetition period of the highest modulation frequency. Thus, the one-shot 82 produces at an output 82A a waveform as shown in FIG. 10c. On the other hand, it produces at an output 82B a waveform as shown in FIG. 10d which is the complement of the waveform at the output 82A. The output 82B is connected to the output of the differentiation circuit 81 and to the input of the OR circuit 83. When there exists no dropout, the waveform as shown in FIG. 10a is reproduced and the OR circuit 83 produces the waveform as shown in FIG. 10e so that a HIGH level signal is applied to a reset input 84A of a counter circuit 84. When the HIGH level signal is applied to the reset input 84A, the counter circuit 84 counts up when clock signals are applied to its clock input 84B, and when the content thereof reaches 2, it produces a HIGH level output at the output terminal 84C to stop further counting while maintaining the HIGH level output. When a LOW level signal is applied to the reset input 84A, the counter circuit 84 produces a LOW level output at the output terminal 84C to reset the counter. When there exists no dropout, the reset input is HIGH as described above and hence the counter circuit 84 counts up the input waveform shown in FIG. 10c applied to the clock input 84B and it produces the HIGH output. This output is written into a flip-flop 85 by reproducing clock shown in FIG. 10k to produce dropout detection signal which is in synchronism with the clock.

When there exists the dropout, the reproducing amplifier is operated by the noise and the input waveform as shown in FIG. 10f is applied to the differentiation circuit 1. Period T corresponds to the dropout period. Because the one-shot 82 is of non-triggerable type, the one-shot 82 at this time produces a waveform as shown in FIG. 10h at the output 82B thereof. Accordingly, by the OR function of the output waveform shown in FIG. 10g of the differentiation circuit 81 and the output waveform shown in FIG. 10h of the one-shot 82, a waveform as shown in FIG. 10i is applied to the reset input 84A of the counter circuit 84. On the other hand, the complement of the waveform shown in FIG. 10h is applied to the clock input 84B. As is apparent from the input waveform of FIG. 10i applied to the reset input 84A, the counter circuit 84 is continuously reset during the dropout period and the output 84C is at LOW level. When the dropout period is finished, the counter circuit 84 is no longer reset, and when two or more clock signals are applied to the clock input 84B, the output 84C becomes a HIGH level, which is thereafter maintained until next dropout occurs. This output is written into the flip-flop 85 by the reproducing clock shown in FIG. 10k to produce dropout detection signal shown in FIG. 10l which is in synchronism with the clock.

The output signal of the dropout detection circuit 8 is the complement of the waveform shown in FIG. 10l, which output is HIGH only during the dropout period.

Figure 11:
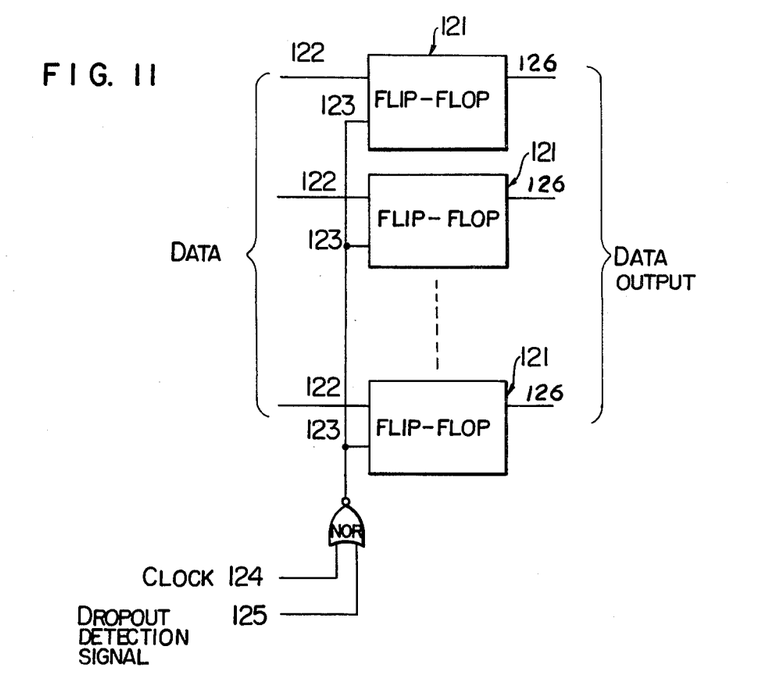
FIG. 11 shows a detailed configuration of a supplement circuit.
Figure 12:
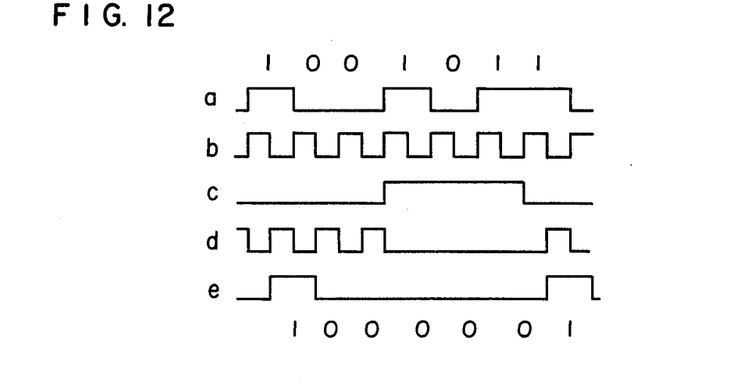
FIG. 12 shows waveforms for explaining the operation of the circuit of FIG. 11.

FIG. 11 shows a specific embodiment of the supplement circuit. The operation thereof is explained in detail in conjunction with FIG. 12. Data (e.g. 12-bit data) is applied parallel by bit to input terminals 122 of flip-flops 121. Applied to write clock inputs 123 of the flip-flops 121 is NOR function of clock 124 and dropout detection signal 125. Let consider a flip-flop for a particular bit, and assume that the input thereto is 1 0 0 1 0 1 1 as shown in FIG. 12a. The waveform of the clock 124 is shown in FIG. 12b. It is assumed that the dropout detection signal 125 has a HIGH level period as shown in FIG. 12c. At this time, the NOR circuit produces an output waveform as shown in FIG. 12d, which is applied to the clock input 123. Since the flip-flop 121 produces the data input at the rise of the clock, a data output as shown in FIG. 12e is produced at the output 126 of the flip-flop 121. Thus, it is seen that the previous data, that is, "0" data is held during the previous value holding period (during the 101 data period).

What is claimed is:

1. A method for detecting and correcting or supplementing signal error in recording a signal, comprising the steps of;
   converting an analog signal into an M-bit digital signal, where M is an integer;
   adding an i number of parity bits to said M-bit digital signal, where $1 \leq i < M$;
   recording said i parity bits and said M-bit digital signal concurrently and in parallel by bit on a recording medium;
   reproducing in parallel said i parity bits and the M-bit digital signal from said recording medium;
   detecting dropouts in said parallel reproduced signal and detecting the number of dropout bits;
   correcting the dropout bits when the number of dropout bits is not more than i while generating a supplement signal when the number of dropout bits is more than i; and
   converting the corrected or supplemented reproduced signal into an analog signal.

2. A method according to claim 1, wherein said step for adding i parity bits to said M-bit digital signal includes substeps of dividing said M bits into a plurality of groups starting from the most significant bit and adding at least one parity bit to at least one group of said plurality of groups selected from higher order groups, the bits in each of the groups as well as the parity bit being recorded in parallel by bit, said step for detecting the number of dropouts including a step for detecting the number of dropouts for each of the groups to which the parity bit is added, and said step for generating the dropout correction/supplement signal including a step for effecting the correction of bit data for a single dropout error in each of the groups to which the parity bit is added and generating said supplement signal when two or more dropouts are detected in at least one of said groups.

3. A method according to claim 1, wherein said step for adding the parity bit includes a step for adding one parity bit to higher order N bits (where $N \leq M$), and said correction step includes a step to carry out the correction when a single dropout is detected.

4. A method according to claim 1, wherein said recording step includes a step for recording the M-bit digital signal bits in parallel such that the higher order bits are not arranged to be adjacent to each other.

5. A method according to claim 1, wherein said recording step includes a step for recording the M-bit digital signal bits in parallel such that one of the higher order bits and one of the lower order bits are arranged to be adjacent to each other.

6. A method according to claim 5 further including a step for recording the M-bit digital signal bits such that the most significant bit and the least significant bit are arranged to be adjacent to each other.

7. A method of detecting and correcting or supplementing signal error in recording a signal comprising the steps of;

converting an analog signal into an M-bit digital signal;

dividing said M-bit digital signal into i groups (where $i \geq 2$);

adding at least one parity bit to each of at least one group selected from i groups;

recording the bits in each of said groups parallel by bit;

reproducing the bits in each of said group parallel by bit;

detecting the number of bits encountering dropout in each of the groups to which the parity bit is added;

correcting the dropout bit data when a single dropout is detected in each of the groups to which the parity bit is added and generating a supplement signal when two or more dropouts are detected in at least one of said groups; and combining the bits of each of said groups and digital-to-analog converting the combined bits to produce an analog signal.

8. A method according to claim 7, wherein i is equal to three and one parity bit is added to each of two of the three groups.

9. A signal recording and reproducing apparatus comprising:

means for converting an analog signal into an M-bit digital signal;

means for dividing said M-bit digital signal into a plurality of groups;

means for adding one parity bit to each of at least one higher order group selected from said plurality of groups;

means for recording the M-bit digital signal including parity bits onto a record medium;

means for reproducing the M-bit digital signal from said record medium;

means for reforming the reproduced M-bit digital signal into each of said groups;

means for counting the number of dropout bits for each of the groups to which the parity bit was added; and means responsive to an output from said count means for correcting the dropout bit in each of the groups to which the parity bit is added when a single dropout is counted in that group and generating a group supplement signal to supplement all bits of the reproduced signal when two or more dropouts are detected in at least one of said groups.

10. An apparatus according to claim 9 further comprising means for detecting from an associated parity bit whether an error occurred in a said group and permitting correction of a dropout error within said group only if a parity check error is revealed.

11. A method for detecting and correcting or supplementing signal error in recording a signal comprising the steps of:

converting an analog signal into an M-bit digital signal having at least one group of bits, where M is an integer;

adding a parity bit to said M-bit signal for each group of bits;

recording said M-bit digital signal and parity bit in parallel on a recording medium;

reproducing in parallel said M-bit signal and parity bit;

detecting for dropout errors in said group of bits in said reproduced M-bit digital signal and whether more than one dropout occurs in said group;

correcting any detected dropout error bits in said group when the number of dropout bits in said group equals one while generating a supplemental M-bit signal when the number of dropout bits in said group is greater than one; and, converting the corrected or supplemented reproduced M-bit signal into an analog signal.

12. A method according to claim 11 further comprising the step of checking the bit parity of said group in accordance with the reproduced parity bit and correcting the dropout error bit in said group only if said parity check signifies that an error occurred.

13. A method according to claim 12 wherein a plurality of groups of bits are provided in said recorded and reproduced M-bit digital signal each associated with a respective parity bit.

* * * * *